J. H. GOODELL.
STRAIGHTENING VENEERS.
No. 17,736. Patented July 7, 1857.
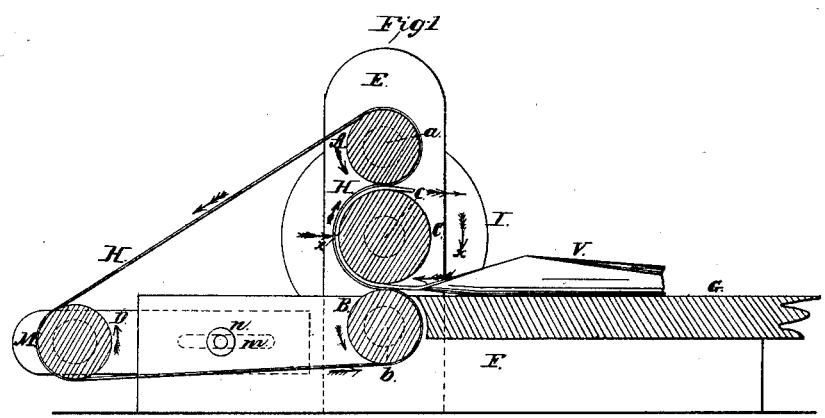
 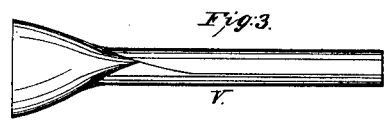 
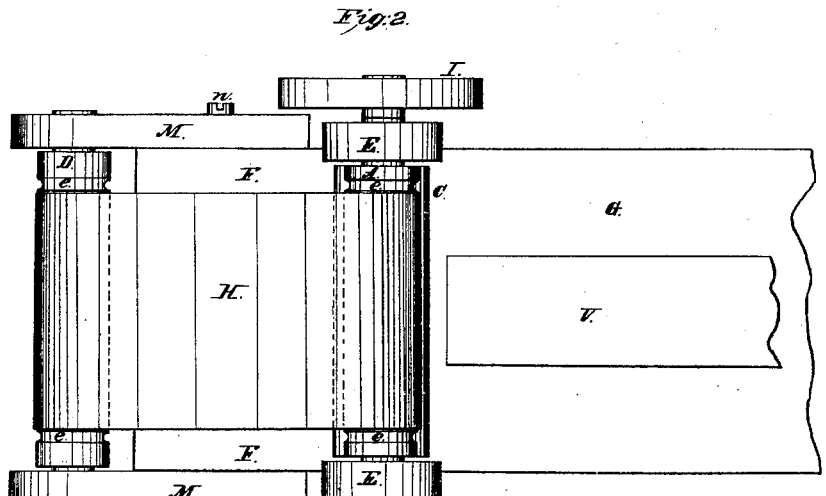
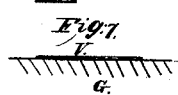 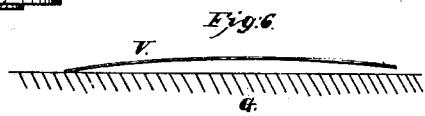

UNITED STATES PATENT OFFICE.

JOSEPH H. GOODELL, OF BRIDGEPORT, CONNECTICUT.

MACHINE FOR STRAIGHTENING VENEERS.

Specification of Letters Patent No. 17,736, dated July 7, 1857.

*To all whom it may concern:*

Be it known that I, JOSEPH H. GOODELL, of Bridgeport, in the county of Fairfield and State of Connecticut, have invented a certain new and useful Improvement in Machinery for Straightening Veneers, of which the following is a full, clear, and exact description, reference being had to the accompanying drawings, which form part of this specification, and in which—

Figure 1 represents a longitudinal vertical section of the machine, with a veneer in the course of being straightened; Fig. 2 a top view or plan, with the veneer after it has passed through the machine and as it appears after delivery; and Figs. 3, 4, 5, 6, and 7, diagrams in illustration of the work to be performed and how completed, as hereinafter described.

In the manufacture of veneers, especially those which are cut from a log or stick by a knife or cutter having a curvilinear scroll, or cylindrical stroke, or the log or stick having such stroke and the cutter stationary, the curved form given to the veneers is, in itself, objectionable. Of course, after suitable preparation and the application of cauls and so forth, the veneers may be "laid" straight on the work to be veneered; but this is not all that is necessary or desirable, and my improvement has reference to a different and previous or intermediate, preparatory, process. Thus, whether the veneers be required for immediate use or not, say not required as cut, but made in large quantities to stock or pack away as an article of commerce it is desirable, both for the saving of room and convenience of packing, to avoid after breakage by rough handling in straightening of so fragile and expensive goods, and to put them on the market in a convenient shape for use, that the veneers should have the curved or scroll form assumed by them in being cut, or when cut, removed, and be flattened or straightened out, or have a gentle tendency to curve given them in direction of right angles or thereabout to the curve produced by the cut so as better to prevent them reassuming the direction of their cut curve. This may appear a simple thing to do, but mere rollers, or a press action, are very apt to injure thin veneers made from expensive woods, are unsuited to veneers made from some kinds of wood or various grains, and fail to do the required work properly. It I accomplish in the following expeditious, soft and easy, and effectual manner.

I arrange three rollers (A, B, C), one above the other, or the middle roller (C) might perhaps preferably be put so that a vertical line intersecting the centers of the upper and lower rollers (A, B) would come a little in advance of the center of the middle roller which would thus stand slightly back. These rollers have their peripheries apart a little more than the thickness of the veneer to be operated on. They may be of any desired relative diameters and length or breadth on their faces which I make straight or nearly so. The trunnions (a, b, c) of these rollers may rest and turn in standards (E, E), on either side of a frame (F) which carries a table (G) in front of said rollers for "feed" between two of them. In connection with these rollers (A, B, C), is another roller (D) at the back, and around it, and the others, is arranged a broad canvas or cloth endless apron (H) which laps around the rear roller (D) and middle roller (C) at their backs and around the front portions of the upper and lower front rollers (A, B).

Upon motion being communicated to one of the rollers, say the center one (C) by pulley (I) turning in direction of the arrow $x$, the other rollers and the endless apron will move as indicated by their respective arrows in Fig. 1, the apron (H) acting as a driver to three of the four rollers, but this is only one of its functions and its purpose may be said to be a triple one, its principal duties being those of a guide or carrier and gentle presser to the veneers as hereinafter explained. To keep the apron in true travel and free from lateral shake, the edges of the apron may be corded and the cords work in grooves (E) in the rollers (A, B, D), if desired.

In cutting up a log or stick into veneers, of say the full length of the log or stick and the cut made as it may be termed laterally, in the length thereof, whether said cut be a straight one or a curved or scroll one, the veneers will be found more or less curled up, breadthwise, according to the thickness of the veneer cut, thus they may be only gently curved as in Fig. 5, or if produced by a scroll or curved cut, which I have preferred to select for illustration here, and the veneer be a thin one and cut from a small radius, they may be curled up into a scroll as in Figs. 3 and 4. In either case, but select for illustration the latter, I take the veneers, which may be previously softened or prepared if required, and laying them, or one by one at a time, on the table (G), gently open the one end of the veneer, as in Fig. 3, and introduce said opened or partially straightened end between the driving or feed roller (C) and that portion of the endless apron (H) which covers the bottom front roller (B) when, the apron and rollers moving as indicated by their respective arrows in Fig. 1, the veneer will be unrolled, straightened out breadthwise, and carried around the middle roller (C) between it and that portion of the apron (H) that laps around the back portion of said roller, and out under the top roller (A) as represented in Fig. 1 of the drawing. The veneer thus delivered will be changed from either of the forms represented in Figs. 4 and 5, to the straightened-out shape given it in Fig. 7 or thereabout, so far as its transverse configuration is concerned. Its longitudinal figure on delivery is represented in plan, Fig. 2, in red lines (the veneer being shown in red lines and marked V throughout the several figures), and in longitudinal vertical section in Fig. 6, in which figure it will be seen that the veneer is slightly arched longitudinally, that is transversely to its former or cut curve as in Figs. 4 and 5, or previously to being straightened or its cut curve removed, as in Fig. 7; which arched form or tendency, lengthwise, will serve to restrain the veneer from reassuming its cut curve or tendency to curl up again in that direction, but which arched configuration, longitudinally—for all practical purposes such as packing in flat layers and so forth—may be sufficiently reduced or removed by the operator drawing his hand lengthwise on and over the veneer as it is delivered on the table (G) of the machine after the curve assumed by it in the cut has been removed as described.

What is termed "straightening" then, the veneer, or removal of the curl given it in cutting it by the combined action of the rollers and endless apron, it will be observed, is not effected by a mere roller squeezing action or pressure, but by a gradual and prolonged soft and easy pressure of the veneer between the one roller (C) and the endless apron (H) lapping around it at the back, the two—by the relative arrangement of the apron and several rollers—first receiving the veneer easily in between them and the pressure of the apron on the veneer against the periphery of the roller (C) gradually increasing till say, the veneer arrives midway of its rear travel around said roller where the pressure is greatest as indicated by the arrow Z, by reason of the tendency of the apron to assume a straight connecting line between the top and bottom rollers (A, B) in front of the middle roller or axis thereof. This action effectually prevents all injury of delicate veneers and effects the straightening of them.

To give the apron (H) diminished or increased straightening pressure to meet the wants of various veneers and to insure the apron's moving for it to act as a carrier as well as a presser to the veneer around the rear portion of the roller (C) the hindmost roller (D) is hung so that it may be made to strain more or less the endless apron by, say, supporting the trunnions of said roller (D) in an adjustable frame piece or pieces (M) attached to the main frame (F) by slots (m) and screw bolts (n) so as to admit of said adjustable roller frame (M) being set in or out to give increased or diminished tension to the apron.

What I claim as new and useful herein, and desire to secure by Letters Patent is—

1. The reduction or removal of the curve or scroll shape given the veneer in its cut from the log or stick by the introduction and feed of it endwise, that is transversely to the general direction of the curve assumed by it in the cut between a roller or rollers and carrying and pressing apron arranged for operation together, and on the veneer, substantially as specified.

2. And I further claim, in combination with the several rollers (A B C D) and endless carrying and pressing apron (H) when the same are relatively arranged as described the adjustable frame (m) to the one roller (D) to give increased or diminished pressure to the apron (H) against the back of the pressing roller (C) or interposed veneer, as and for the purposes set forth.

In testimony whereof, I have hereunto subscribed my name.

JOSEPH H. GOODELL.

Witnesses:
E. A. PARROTT,
WM. A. PARROTT.